(12) United States Patent
Lu et al.

(10) Patent No.: US 9,027,103 B2
(45) Date of Patent: May 5, 2015

(54) METHOD AND SYSTEM FOR SECURELY ACCESSING TO PROTECTED RESOURCE

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 13/807,351

(22) PCT Filed: Sep. 21, 2011

(86) PCT No.: PCT/CN2011/079929
§ 371 (c)(1),
(2), (4) Date: Dec. 28, 2012

(87) PCT Pub. No.: WO2012/037886
PCT Pub. Date: Mar. 29, 2012

(65) Prior Publication Data
US 2013/0104218 A1 Apr. 25, 2013

(30) Foreign Application Priority Data

Sep. 26, 2010 (CN) .......................... 2010 1 0292035

(51) Int. Cl.
G06F 21/31 (2013.01)
H04L 9/32 (2006.01)
H04L 29/06 (2006.01)

(52) U.S. Cl.
CPC .............. *G06F 21/31* (2013.01); *H04L 9/3273* (2013.01); *H04L 63/0869* (2013.01); *H04L 63/10* (2013.01)

(58) Field of Classification Search
CPC ... G06F 21/31; H04L 9/3226; H04L 63/0869; H04L 63/10; H04L 9/3273
USPC ............................................................ 726/7
See application file for complete search history.

(56) References Cited

U.S. PATENT DOCUMENTS 6,160,903 A    12/2000  Hamid et al.
7,904,946 B1 *  3/2011  Chu et al. .......................... 726/5

(Continued)

FOREIGN PATENT DOCUMENTS

CN           1802029     *  1/2006
CN         101127876     *  9/2007

(Continued)

*Primary Examiner* — Joseph P Hirl
*Assistant Examiner* — J. Brant Murphy
(74) *Attorney, Agent, or Firm* — Hammer & Associates, P.C.

(57) ABSTRACT

The invention provides a method for securely accessing to protected resource and a system thereof, which belongs to information security field. A first terminal sends a request for accessing to the protected resource to a second terminal, and sends a user name and first data to the second terminal; the second terminal generates second data, and searches for a secret on a third terminal; the second terminal processes the first data, the second data, and the secret, so as to obtain a first characteristic value; the third terminal processes the first data, the second data, and the secret so as to obtain a second characteristic value, and upon receiving a confirmation message, processes the first data, the second data, and a secret pre-stored at/on the third terminal so as to obtain a third characteristic value; the first terminal sends the third characteristic value to the second terminal; the second terminal processes the first data, the second data, and the secret to generate a fourth characteristic value, and determines whether the fourth characteristic value is identical to the third characteristic value by comparison, if they are identical, accessing is permitted; otherwise, accessing is refused.

10 Claims, 4 Drawing Sheets

(56) References Cited

U.S. PATENT DOCUMENTS

| | | |
|---|---|---|
| 8,189,604 B2 * | 5/2012 | Rautiola et al. ............... 370/401 |
| 8,209,744 B2 * | 6/2012 | Zhu et al. ........................ 726/5 |
| 2006/0206709 A1 * | 9/2006 | Labrou et al. ................. 713/167 |
| 2007/0174429 A1 * | 7/2007 | Mazzaferri et al. ........... 709/218 |
| 2008/0263126 A1 * | 10/2008 | Soman ........................... 709/201 |
| 2009/0013063 A1 * | 1/2009 | Soman ........................... 709/223 |
| 2009/0307765 A1 * | 12/2009 | Mardikar et al. ................. 726/7 |
| 2010/0107229 A1 * | 4/2010 | Najafi et al. ....................... 726/6 |
| 2010/0262834 A1 * | 10/2010 | Freeman et al. ............... 713/184 |
| 2013/0283363 A1 * | 10/2013 | Rautenberg et al. .............. 726/7 |

FOREIGN PATENT DOCUMENTS

| | | | |
|---|---|---|---|
| CN | 101742060 | * | 6/2010 |
| GB | 2457491 A | * | 8/2009 |
| WO | WO 2009140663 A1 | * | 11/2009 |

* cited by examiner

METHOD AND SYSTEM FOR SECURELY ACCESSING TO PROTECTED RESOURCE

TECHNICAL FIELD

The invention belongs to the information security field, and more particularly, relates to a method for securely accessing to a protected resource and a system thereof.

BACKGROUND OF THE INVENTION

With the fast development of the computer technology, more and more users are accustomed to completing all kinds of work by using a network which is convenience and abundant of resources. To some extent, time is saved and work efficiency is improved, and further development and perfection of the Internet is enhanced. However, with the development of higher technology, the network has great security vulnerabilities while bringing convenience and entertainment to people. For example, usernames or account numbers registered on the Internet of a lot of users might be stolen by other people easily, which would bring economic loss or spiritual loss to the users or related sellers.

SUMMARY OF THE INVENTION

The invention provides a method for securely accessing protected resource. The specific technical solutions are as follows:

A method for securely accessing to protected resource, which comprises a first terminal sending a request of accessing to protected resource to a second terminal and sending a user name input by a user and a first data to the second terminal, wherein the first data is generated by a third terminal;

the second terminal generating a second data and searching for a secret of the third terminal according to the user name;

the second terminal processing the first data, the second data and the found secret according to a first predetermined processing method to obtain a first characteristic value, and sending the first characteristic value and the second data to the first terminal; the first terminal sending the first characteristic value and the second data to the user;

the third terminal receiving the second data input by the user and processing the first data, the second data and the secret pre-stored by the third terminal to obtain a second characteristic value, and, after receiving information that the user determines that the first characteristic value is identical to the second characteristic value by comparison, processing the first data, the second data and the secret pre-stored by the third terminal according to second predetermined processing method to obtain a third characteristic value and outputting the third characteristic value to the user;

the first terminal sending the third characteristic value input by the user to the second terminal;

the second terminal processing the first data, the second data and the found secret according to a processing method which is identical to the second predetermined processing method to generate a fourth characteristic value, and comparing the fourth characteristic value with the third characteristic value to determine whether they are identical, if yes, permitting accessing, otherwise, refusing accessing.

A method for securely accessing to protected resource, which comprises a second terminal receiving a request of accessing to protected resource and a user name which are sent by a first terminal, generating a third data according to predetermined algorithm and sending the third data to a user;

a third terminal processing the third data input by the user and a secret pre-stored by the third terminal according to a third predetermined processing method to obtain a fifth characteristic value and outputting the fifth characteristic value to the user;

the second terminal sending the fifth characteristic value input by the user to the second terminal;

the second terminal searching for the secret of the third terminal according to the user name, processing the third data and the found secret according to an algorithm which is identical to the third predetermined processing method to obtain a sixth characteristic value, and comparing the sixth characteristic value with the fifth characteristic value to determine whether they are identical, if yes, permitting accessing; otherwise, refusing accessing.

A system for securely accessing to protected resource, which comprises a first terminal, a second terminal and a third terminal; wherein the second terminal comprises a second storing module configured to store associated information of generating characteristic value, wherein the associated information includes a secret of the third terminal bound with a user name and a predetermined processing method;

a third receiving module configured to receive the request of accessing to protected resource, a user name, a first data and a third characteristic value;

a second random number generating module configured to generate a second data;

a second characteristic value generating module configured to process the first data, the second data and the secret stored by the second storing module by using a first predetermined processing method to generate a first characteristic value; processing the first data, the second data and the secret stored by the second storing module by using the second predetermined processing method to generate the fourth characteristic value;

a verifying module configured to verify the fourth characteristic value generated by the second characteristic value generating module and the third characteristic value received by the third receiving module;

a second outputting module configured to output the second data generated by the second random number generating module and the first characteristic value generated by the second characteristic value generating module;

the third terminal comprises a first storing module configured to store associated information of the characteristic value, wherein the associated information comprise a secret of generating the characteristic value and a predetermined processing method;

a first receiving module configured to receive the second data generated by the second random number generating module of the second terminal and confirming information input by the user;

a first random number generating module configured to generate the first data;

a first characteristic value generating module configured to process the first data, the second data and the secret stored by the first storing module according to a method which is identical to the first predetermined method used by the second characteristic value generating module of the second terminal to generate a second characteristic value; after the first receiving module receives information that the user confirmed that the first characteristic value and the second characteristic value are identical by comparison, process the first data, the second data and the secret stored by the first storing module according to a method which is identical to the second predetermined processing method used by the second characteristic value generating module of the second terminal to generate a third characteristic value;

a first outputting module configured to output the third characteristic value generated by the first characteristic value generating module to the user;

the first terminal comprises a first sending module configured to send the request of accessing to protected resource, the user name, the first data generated by the first random number generating module of the third terminal and the third characteristic value generated by the first characteristic value generating module;

a second receiving module configured to receive the second data generated by the second random number generating module of the second terminal and the first characteristic value generated by the second characteristic value generating module of the second terminal and output the second data and the first characteristic value to the user.

A system of securely accessing to protected resource, which comprises a first terminal, a second terminal and a third terminal; wherein the second terminal comprises a storing module configure to store associated information for generating characteristic value, wherein the associated information comprises a secret of the third terminal bound with a user name and a predetermined processing method;

a receiving module configured to receive a request of accessing to protected resource, the user name, and the fifth characteristic value sent by a sending module of the first terminal;

a random number generating module configured to generate a third data;

a characteristic value generating module configured to process the first data and a secret stored by the storing module of the second terminal by using a first predetermined processing method to generate a sixth characteristic value;

a verifying module configured to verify a sixth characteristic value generated by the characteristic value generating module of the second terminal and the fifth characteristic value received by the receiving module of the second terminal;

the third terminal comprises a storing module configured to store the associated information for generating the characteristic value, wherein the associated information comprises the secret for generating the characteristic value and the predetermined processing method;

a receiving module configured to receive the third data which is input by the user and generated by the random number generating module of the second terminal which provides the third data to the user;

a characteristic value generating module configured to process the third data and the secret stored by the storing module to generate the fifth characteristic value by using a method which is identical to a third predetermined processing method used by the second characteristic value generating module of the second terminal;

an outputting module configured to output the fifth characteristic value which is generated by the characteristic value generating module to the user;

the first terminal comprises a sending module configured to send the request of accessing to the protected resource, the user name and the fifth characteristic value generated by the characteristic value generating module of the third terminal, which are input by the user, to the second terminal;

a receiving module configured to receive the third data generated by the random number generating module of the second terminal and output the third data to the user.

The method and the system provided by the invention can realize digital signature and identity verification, which prevents the attack of an intermediate phishing website and, to some extent, ensures security of transaction on the network.

DETAILED DESCRIPTION OF THE INVENTION

In order to make the object, technical solution and advantages to be much clearer, the following is detailed description for the embodiments of the present invention in conjunction with the accompanying drawings.

Embodiment 1

Figure 1:
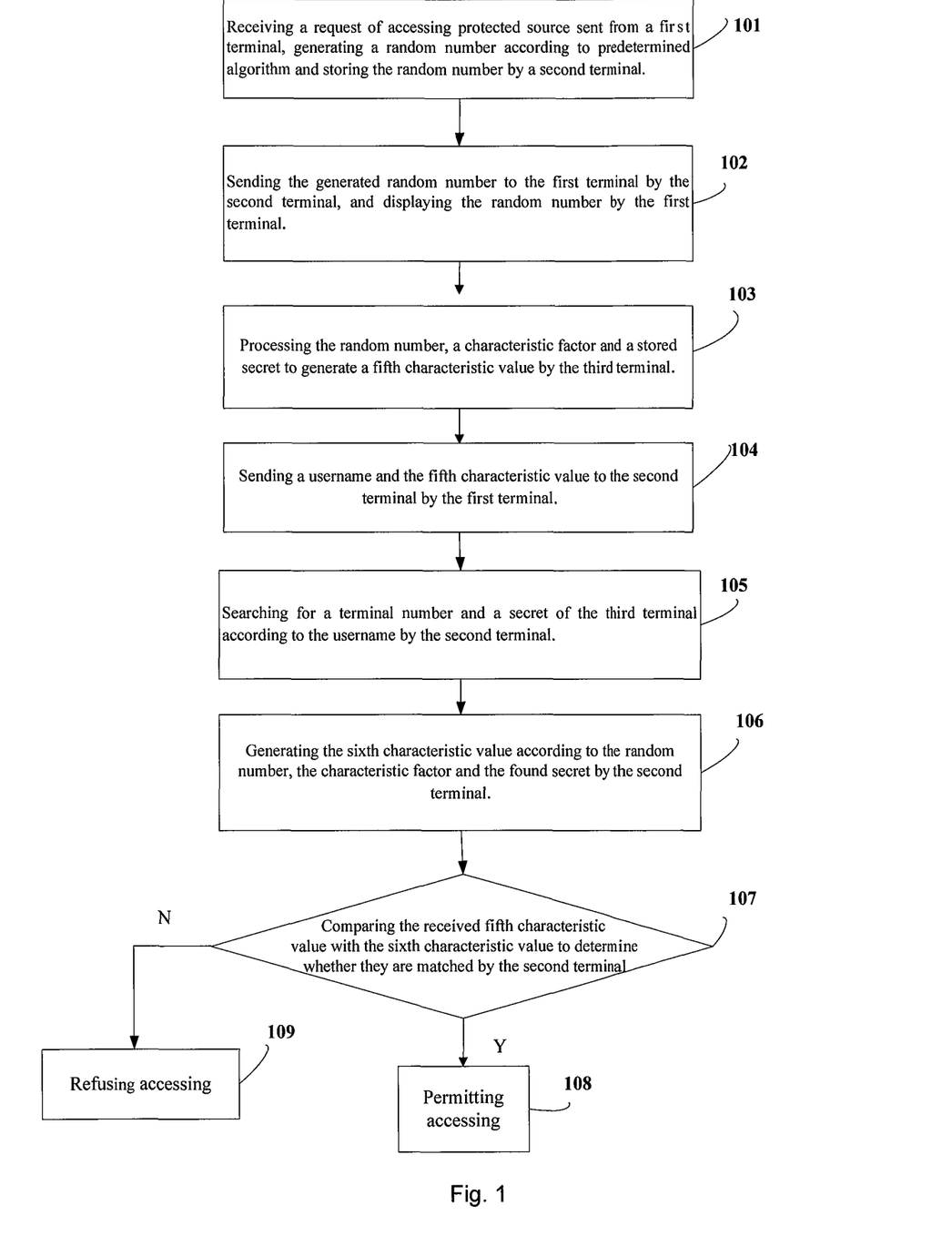
FIG. 1 is a flowchart of a method for securely accessing to protected resource provided by Embodiment 1 of the present invention.

The present embodiment 1 provides a method for securely accessing to protected resource. Referring to FIG. 1, the method is as the following.

101, a second terminal receives a request sent from a first terminal, generates a third data according to a predetermined algorithm, and stores the third data;

Specifically, the generated third data can be, but not limited to, a random number with 2 to 8 digits; the form of the third data is not limited to numbers, and can be letters, or letters+numbers, etc.

102, a second terminal sends the generated third data to the first terminal, and the first terminal displays and outputs the third data;

103, a third terminal processes the third data, a characteristic factor, and a stored secret to generate a fifth characteristic value;

It should be noted that, a user inputs the third data, which is displayed and output by the first terminal, to the third terminal before step 103.

Specifically, the characteristic factor is a current time value or a count value.

Specifically, 1) the third terminal combines the third data and the characteristic factor in order to generate an intermediate value; in this case, combining the third data and the characteristic factor includes but not limited to, serial connection; 2) the intermediate value is encrypted according to a stored secret by using a predetermined cipher algorithm, and cipher text is obtained; 3) the cipher text obtained by step 2) is cut to be short by a predetermined cutting method to obtain the fifth characteristic value.

In this case, the predetermined cipher algorithm includes, but not limited to, SHA1, SHA256, and SHA512;

In this case, the predetermined cutting method includes, but not limited to, at least one of the following methods: mask compressing and custom compressing.

Specifically, the step further includes that the third terminal updates the characteristic factor after generating the fifth characteristic value.

104, the first terminal sends a user name and the fifth characteristic value to the second terminal;

Specifically, the user inputs the user name and the fifth characteristic value, which is generated and displayed by the third terminal, to the first terminal before step 104;

105, the second terminal searches for a device number and a secret of the third terminal;

In the embodiment 1, the third terminal has a unique number, and every third terminal stores a secret, e.g. a static reference, which is required when the third terminal generates a characteristic value by using the characteristic value algorithm; the secrets stored in all of the third terminals are not repeated; After the user binds the user name, such as an account number, with the third terminal, the second terminal stores the number and the secret of the third terminal corresponding to the user account number, and stores a characteristic value algorithm, which is identical to that of the third terminal, for generating the characteristic value;

That the second terminal searches for the secret of the third terminal held by the user according to the user name includes that the second terminal searches for the number of the third terminal, which is bound with the user name of the user, according to the user name, and searches for the secret of the third terminal according to the number of the third terminal;

That the second terminal searches for the secret of the third terminal held by the user according to the user name can further includes that, when the user binds the third terminal with the user name, the second terminal builds a corresponding relation between the user name and the secret of the third terminal; when the second terminal searches for the secret, the second terminal can directly find the corresponding secret of the third terminal according to the user name.

106, the second terminal generates a sixth characteristic value according to the third data, the characteristic factor and the found secret;

Specifically, the second terminal generates the sixth characteristic value by using an algorithm which is identical to the algorithm for generating the fifth characteristic value by the third terminal; no further detail is given here.

In the embodiment 1, the second terminal updates the characteristic factor according to a method which is identical to the method used by the third terminal so as to keep synchronization between the third terminal and the second terminal.

The third terminal or the second terminal updates the characteristic factor by using the way as follows.

Obtaining current international standard time and taking a result, which is obtained by the current international standard time plus or minus a specific value, as an updated time factor; the specific value can be set up or amended as required; for example, the specific value can be set up to be 30 seconds, 60 seconds, etc.

Or, obtaining current count value and taking a result, which is obtained by the current count value plus or minus a specific value, as an updated time factor; the specific value can be set up or amended as required; for example, the specific value can be set to be 1 time, 2 times, etc.

It should be noted that, when both the third terminal and the second terminal take the current time value as the characteristic factor to generate the fifth characteristic value or the sixth characteristic value, the clock frequencies of the third terminal and the second terminal should keep synchronization.

107, the second terminal determines whether the received fifth characteristic value is identical to the sixth characteristic value by comparison, if they are identical, execute step 108;

if they are not identical, execute step 109;

108, access to the protected resource is permitted;

109, access to the protected resource is refused;

In the embodiment 1 of the present invention, when a current count value is participated in generating the character value, the characteristic factor of the second terminal should be corrected; the process of correcting is as the following:

when generating a characteristic value, the times of generating the character value by the device (the third terminal or the second terminal) is taken as the characteristic factor; when the character value is generated for the first time, the characteristic factor is count value 1; when the character value is generated for the second time, the characteristic factor is count value 2; in this analogy, for every time of generating the characteristic value, the count value increases 1 or a predetermined step. Because the times counted by the third terminal and the second terminal are independently, i.e. the counter of the third terminal increases by itself for every time of generating the characteristic value by the third terminal, and the counter of the second terminal increases by itself after successful authentication of the second terminal, the phenomenon of unmatched count numbers happens easily. Therefore, the count value stored in the second terminal should be corrected.

When the characteristic factor used by the third terminal for generating the fifth characteristic value is set up to be count value 218, the characteristic factor stored in the second terminal is count value 210; when the second terminal calculates the sixth characteristic value, the float range of the count value is set up to be 10, characteristic value corresponding to the characteristic factor 210 is calculated, the count value is increased gradually to 210+10, and the sixth characteristic value is calculated simultaneously; for every time a sixth characteristic value is calculated, the sixth characteristic value is compared with the fifth characteristic value; if the sixth characteristic value is not identical to the fifth characteristic value, the count value is increased and the calculation for the sixth characteristic value is kept on. From what is described above, when the second terminal generates the sixth characteristic value, count values 210, 211, ..., 219, and 220 are taken as characteristic factors respectively in such a way that a set of at most 11 characteristic values are generated; the second terminal compares the received fifth characteristic value with the 11 characteristic values; when the second terminal determines the comparison is successful for the character value which is generated by taking the count value 218 as the characteristic factor, the fifth characteristic value is regarded to be correct, and the calculation of the sixth characteristic value is stopped; at that time, the count value stored at the second terminal should be corrected and 218 is taken as the correct count value so as to keep synchronization between the count value of the third terminal and that of the second terminal; at same time, the second terminal adds 1 (or a predetermined step) to the count value 218, and stores the increased count value as the characteristic factor for the next time of calculating the characteristic value. If none of the above 11 characteristic values is identical to the fifth characteristic value, the fifth characteristic value is regarded to be incorrect.

When the characteristic factor participated in the calculation is the currently obtained time value and in order to prevent the delay of the operation which might lead to the update of the characteristic factor which might be not synchronized with the characteristic factor, a tolerance range may be provided. Specifically, the second terminal takes a plurality of sixth characteristic values generated by using the method for generating the fifth characteristic value by the third terminal as a window, and performs verification by comparing whether a sixth characteristic value in the window is identical to the fifth characteristic value, if yes, the verification is successful, if none of the sixth characteristic values is identical to the fifth characteristic value, the verification is failed;

Correspondingly, when a sixth characteristic value in the window is identical to the fifth characteristic value, the second terminal takes the characteristic factor corresponding to the sixth characteristic value for successful verification as the current characteristic factor, and updates the current characteristic factor according to the method which is identical to the method of the third terminal.

For example, the third terminal generates a fifth characteristic value with 6 digits every 60 seconds inside, i.e. if the current time is "10:57:00" and the generated fifth characteristic value is "708902", the time of generating a next fifth characteristic value is "10:58:00". If the current time of the second terminal is "10:57:00", decrease or increase a specific value, for example, 60 seconds, on the basis of time, other 6 characteristic factors, i.e. "10:24:00", "10:25:00", "10:26:00", "10:58:00", "10:59:00", and "11:00:00" are obtained; the second terminal generates 7 sixth characteristic values respectively according to the current characteristic factor and other 6 characteristic factors; the 7 sixth characteristic values are arranged as follows according to time: "718002", "540065", "540786", "708902", "005468", "654009", and "075400"; the second terminal compares the received fifth characteristic value with the 7 sixth characteristic values, if the fifth characteristic value is identical to one of the 7 sixth characteristic values, the present verification is successful, accessing is permitted and the characteristic factor corresponding to the currently matched characteristic value is determined, and the characteristic factor is updated for the next time of verification; for example, if the currently matched characteristic value is "708902" and the corresponding characteristic factor "10:57:00", the characteristic factor is updated to be "10:58:00"; if none of the 7 sixth characteristic values is identical to the fifth characteristic value, the present verification is failed and accessing is refused.

It should be noted that, when calculating a characteristic value or a verification code, the characteristic factor is optional in the computing besides the necessary third data and secret; other options, such as session information, PIN code, or PIN code hash value, etc. can also participate in the calculating; the options participating the computing are predetermined.

It should be noted that, when the third data generated by the second terminal is data to be singed or a hash value thereof, the above accessing process based on the characteristic value can realize function of digital signature (plain text signature), i.e. the third terminal computes signature, i.e. the fifth characteristic value, by using the third data for signature and the algorithm for generating the fifth characteristic value introduced above and sends the signature to the second terminal; the second terminal uses the verification method described above (generating a first verification code and determining whether the first verification code is identical to the fifth characteristic value) to verify the signature, which achieves the purpose of digital signature as realizing the first terminal verification.

In practice, the third data in the above embodiment 1 is converted from the data to be signed or the harsh value thereof.

Embodiment 2

Figure 2:
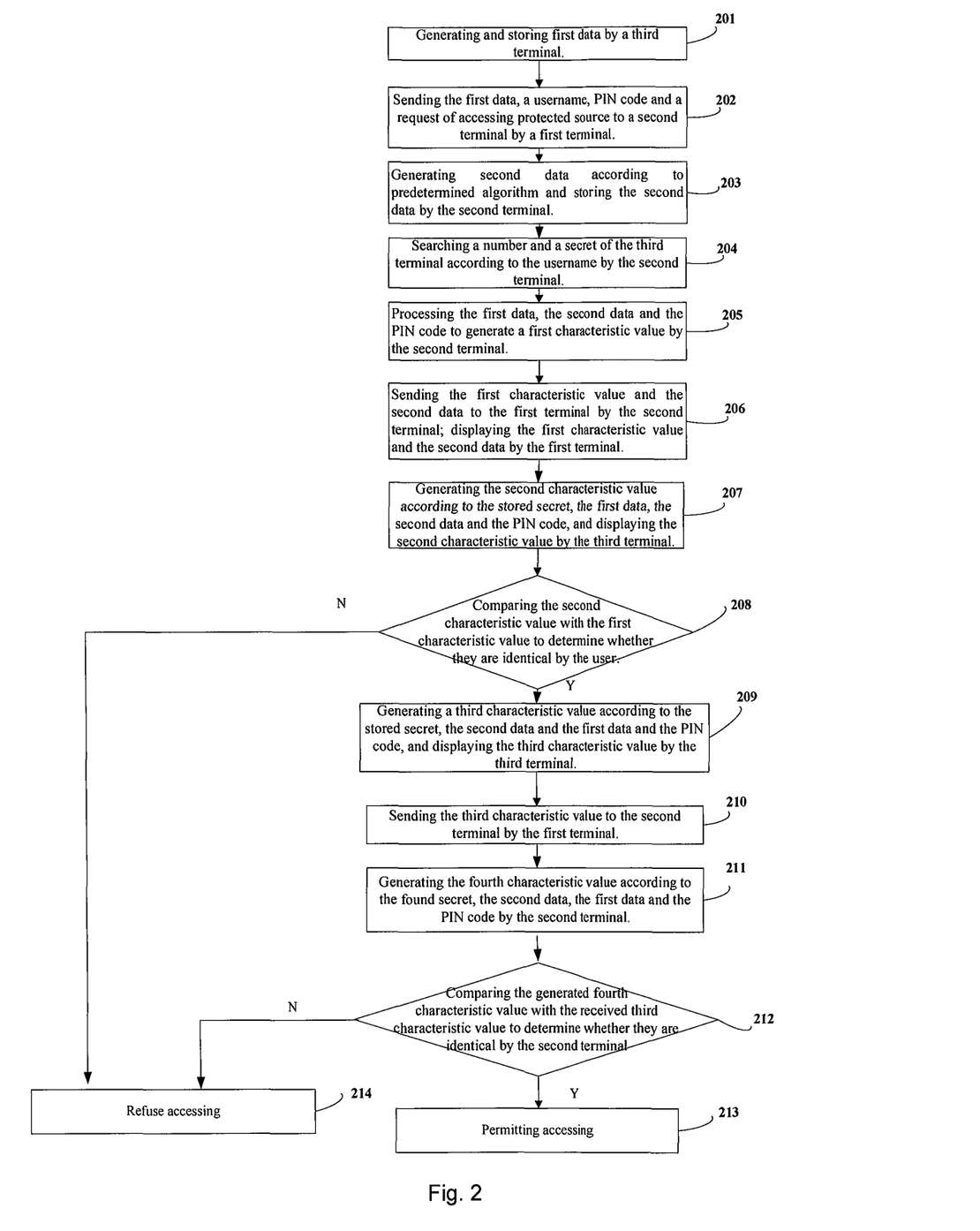
FIG. 2 is a flowchart of another method for securely accessing to protected resource provided by Embodiment 2 of the present invention.

The embodiment 2 provides a method for securely accessing to protected resource. Referring to FIG. 2, the method is as the following.

201, a third terminal generates and stores a first data; specifically, the first data is a random number;

It should be noted that there are many ways to generate the random number by the third terminal. For example, the third terminal has a press key. When a user presses the press key for the first time, the third terminal generates a random number according to built-in algorithm. In this case, the random number can have, but not limited to, 2 to 8 digits and can be, but not limited to, in form of letters, or letters+numbers, etc.

202, the first terminal sends the first data, a user name, PIN code, and a request of accessing to the protected resource to a second terminal;

Before the present step, a user inputs the first data generated and displayed by the third terminal, the user name, and the PIN code to the first terminal.

203, the second terminal generates a second data according to predetermined algorithm, and stores the generated second data;

In this case, the second data specifically can be a random number, the value of the second data can be any random number which has, but not limited to, 2 to 8 digits; the value, which is not limited to form of number as well, can be letters, or letters+numbers, etc.

204, the second terminal searches for a number, and a secret of the third terminal according to the received user name;

In the present embodiment 2, the third terminal has a unique number, and every third terminal stores a secret. The secret is a static reference required by the third terminal for generating a characteristic value by using the characteristic value algorithm; the secrets stored in all of the third terminals are not repeated; after the user binds the user name, such as an account number, with the third terminal, the second terminal stores the number and the secret of the third terminal corresponding to the user account number, and stores characteristic value algorithm, which is identical to that of the third terminal, for generating the characteristic value;

That the second terminal searches for the secret of the third terminal held by the user according to the user name includes that the second terminal searches for the number of the third terminal, which is bound with the user name of the user, according to the user name, and searches for the secret of the third terminal according to the number of the third terminal;

That the second terminal searches for the secret of the third terminal held by the user according to the user name can also includes that, when the user binds the third terminal with the user name, the second terminal builds a corresponding relation between the user name and the secret of the third terminal; and when the second terminal searches for the secret, the second terminal can directly find the corresponding secret of the third terminal according to the user name.

205, the second terminal processes the secret, the first data, the second data, and the PIN code to generate a first characteristic value, and saves the generated first characteristic value;

Specifically, 1) the second terminal combines the first data, the second data, and the PIN code to generate an intermediate value; in this case, combining the first data, the second data, and the PIN code includes, but not limited to, a serial connection; 2) the intermediate value is encrypted according to the secret found by searching and a predetermined cipher algorithm so as to obtain cipher text; and 3) the cipher text obtained by step 2) is cut to be short by a predetermined cutting method so as to obtain the first characteristic value.

In this case, the predetermined cipher algorithm includes, but not limited to, SHA1, SHA256, and SHA512;

In this case, the predetermined cutting method includes, but not limited to, at least one of the following methods: mask compressing and custom compressing.

206, the second terminal sends the first characteristic value and the second data to the first terminal, the first terminal displays and outputs the first characteristic value and the second data;

207, the third terminal generates a second characteristic value according to the stored secret, the first data, the second data, and the PIN code, and displays and outputs the second characteristic value;

Before the step, the user inputs the PIN code, as well as the second data output and displayed by the first terminal to the third terminal;

In the embodiment 2, the third terminal generates a second characteristic value upon the second time of triggering of the user; the algorithm for generating the second characteristic value is identical to the algorithm for generating the first characteristic value by the second terminal in step 205; no more detail is given here;

208, the user compares the second characteristic value output by the third terminal with the first characteristic value displayed by the first terminal, if they are identical, the second terminal is regarded to be legitimate, go to step 209;

if they are not identical, the second terminal is regarded to be illegitimate, go to step 214;

209, the third terminal generates a third characteristic value according to the stored secret, the second data, the first data, and the PIN code, displays and outputs the third characteristic value;

In the embodiment 2, the third terminal generates the third characteristic value upon the third time of triggering of the user;

Specifically, 1) combining the second data, the first data, and the PIN code to generate an intermediate value; in this case, combining the second data, the first data, and the PIN code includes, but not limited to, a serial connection; 2) encrypting the intermediate value according to the stored secret by using predetermined cipher algorithm so as to obtain cipher text; and 3) cutting the cipher text obtained by step 2) to be short by a predetermined cutting method so as to obtain the first characteristic value.

In this case, the predetermined cipher algorithm includes, but not limited to, SHA1, SHA256, and SHA512;

In this case, the predetermined cutting method includes, but not limited to, at least one of the following methods: mask compressing and custom compressing.

210, the first terminal sends the third characteristic value to the second terminal;

Before the step, the user inputs the third characteristic value generated by the third terminal to the first terminal.

211, the second terminal generates a fourth characteristic value according to the found secret, the second data, the first data, and the PIN code;

Specifically, the second terminal generates the fourth characteristic value according the found secret, the second data, the first data, and the PIN code by using the algorithm which is identical to the algorithm for generating the third characteristic value by the third terminal;

212, the second terminal determines whether the generated fourth characteristic value is identical to the received third characteristic value by comparison, If they are identical, the first terminal is regarded to be legitimate, go to step 213;

If they are not identical, the first terminal is regarded to be illegitimate, go to step 214;

213, accessing to the protected resource is permitted;

214, accessing to the protected resource is refused.

It should be noted that, when generating the characteristic value, the references used for generating the characteristic value are optional except for the first data, the second data, and the secret; for example, the characteristic factor participated in computing in Embodiment 1, the PIN code in Embodiment 2 and optional factor can further includes session information between the first terminal and the second terminal; the options participated in the computing is predetermined.

It should be noted that, for generating the first characteristic value and the third characteristic value, the ways for combining the first data and the second data, which are participated in computing, are different.

It should be noted that, when the second data generated by the second terminal is data to be signed or a hash value thereof, the above accessing process based on the characteristic value can realize function of digital signature (plain text signature); the process is as the following. The first terminal sends a random first data to the second terminal; the second terminal computes response of the first data (i.e. the first characteristic value) and sends the second data for signing to the first terminal; the first terminal verifies the response of the second terminal at first (i.e. the third terminal generates the second characteristic value and compares whether the second characteristic value is identical to the first characteristic value), and then computes the signature of the random number for signature (i.e. the third characteristic value is generated), and sends the signature to the second terminal; the second terminal verifies the signature (i.e. the fourth characteristic value is generated and is determined whether it is identical to the third characteristic value by comparison). In this way, as the identity of the first terminal is verified, the purpose for digital signature is achieved.

In practice, the random number in the above embodiment 2 is converted from the data to be signed or a hash value thereof.

Embodiment 3

Figure 3:
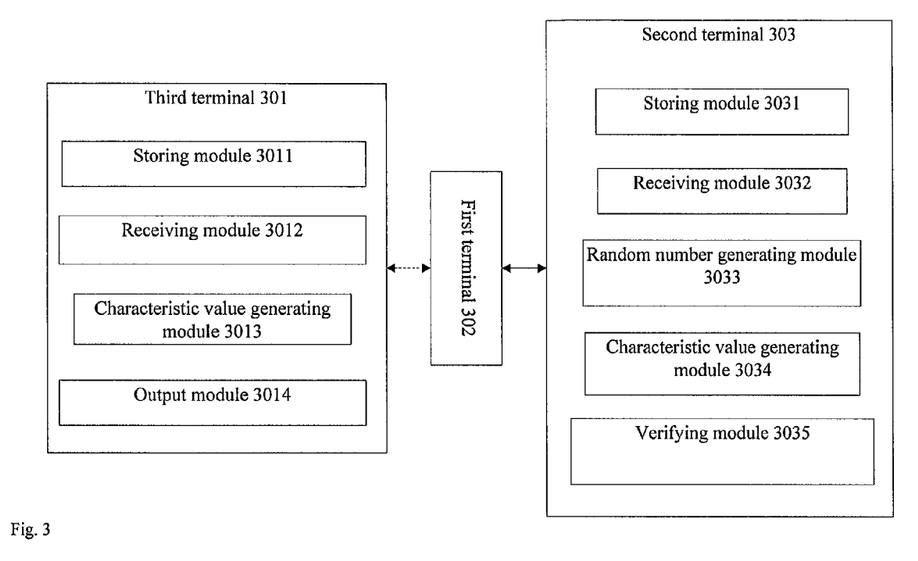
FIG. 3 is a structural diagram of a system of securely accessing to protected resource provided by Embodiment 3 of the present invention.

The present embodiment 3 provides a system of securely accessing to protected resource. Referring to FIG. 3, the system includes a third terminal 301, a first terminal 302, and a second terminal 303; in this case, functions of respective devices are as follows.

The third terminal 301 includes a storing module 3011 configured to store associated information for generating a characteristic value; the associated information includes a secret for generating the characteristic value and a predetermined processing method;

wherein, the predetermined processing method includes a predetermined cipher algorithm and a predetermined cutting method;

a receiving module 3012 configured to receive confirming information input by a user (by component such as pressing keys, etc.) and a third data, in which the third data is a random number;

the receiving module 3012 is further configured to receive a PIN code input by the user and the session information between the first terminal and the second terminal;

the characteristic value generating module 3013 configured to, after the receiving module 3012 receives the confirming information input by the user, generate a fifth characteristic value according to the third data received by the receiving module 3012, and the secret stored by the storing module 3011 by using a third predetermined processing method stored by the storing module 3011;

Specifically, the characteristic value generating module 3013 includes an encrypting unit 3013A configured to encrypt the third data received by the receiving module 3012 according to the secret stored in the storing module 3011 by using a third predetermined cipher algorithm;

a generating unit 3013B configured to cut the encryption result of the encryption unit to generate the fifth characteristic value by using a third predetermined cutting processing method;

an outputting module 3014 configured to, after the receiving module 3012 receives confirming information input by the user, output the fifth characteristic value generated by the generating module 3013;

the receiving module 3012 in the present embodiment 2 further can receive PIN code input by the user and session information, etc.;

the storing module 3011 in the present embodiment 2 further can store times of generating the characteristic values.

The first terminal 302 includes a sending module 3021 configured to send a request of accessing to the protected resource, a user name, and the characteristic value generated by the characteristic value generating module 3013 of the third terminal, which are input by the user;

A receiving module 3022 is configured to receive the third data generated by the random number generating module 3033 of the second terminal and output the third data; the third data is a random number;

The first terminal 302 and the second terminal 303, which are connected via internet, have an input device and an output device; the input device is configured to receive information input by the user and send the information to the second terminal via network; the input device can be keyboard, etc.; the output device is configured to output the information received by the second terminal 303 to the user; the output device can be a displayer or an audio player, etc.

The second terminal 303 includes a storing module 3031 configured to store associated information of generating characteristic value, in which the associated information includes the secret of the third terminal bound with the user name and a predetermined processing method;

in this case, the predetermined processing method includes a predetermined cipher algorithm and a predetermined cutting processing method;

a receiving module 3032 configured to receive the request of accessing to the protected resource, the user name, and the fifth characteristic value which are sent by the sending module 3021 of the first terminal 302;

a random number generating module 3033 configured to generate a random number, i.e. the third data in the present embodiment 3;

a characteristic value generating module 3034 configured to generate a sixth characteristic value;

Specifically, the characteristic value generating module 3034 includes a searching unit 3034A configured to search for the secret of the third terminal and the predetermined processing method in the storing module 3031 according to the user name received by the receiving module 3032;

an encrypting unit 3034B configured to encrypt the third data generated by the random number generating unit 3033 according to the secret of the third terminal 301 found by the searching unit 3034A by using the third predetermined cipher algorithm;

a generating unit 3034C configured to cut the encrypting result of the encrypting unit 3034B to be short by using the third predetermined cutting processing method to generate the sixth characteristic value;

a verifying module 3035 configured to verify the sixth characteristic value generated by the characteristic value generating module 3034 and the fifth characteristic value received by the receiving module 3032;

Specifically, the verifying module 3035 includes a comparing unit 3035A configured to determine whether the sixth characteristic value generated by the characteristic value generating module 3034 is identical to the received fifth characteristic value by comparison; and an executing unit 3035B configured to, if the sixth characteristic value generated by the characteristic value generating module 3034 is identical to the received fifth characteristic value after the comparison of the comparing unit, permit access to the protected resource; if the sixth characteristic value generated by the characteristic value generating module 3034 is not identical to the received fifth characteristic value after the comparison of the comparing unit, refuse accessing to the protected resource.

In the present embodiment 3, the receiving module 3032 is further configured to receive the PIN code and the session information which are returned by the first terminal 302, etc.; and the output module 3036 is configured to, after the second generating module 3034 generates the third data, output the third data to the first terminal 302.

In the present embodiment 3, the third predetermined cipher algorithm includes a fingerprint algorithm or cipher hash algorithm;

In the present embodiment 3, the third predetermined cutting processing method includes mask compressing method or custom compressing method.

In the embodiment 3, when the characteristic value generating module 3013 and the characteristic value generating module 3034 generate characteristic values, they can generate the characteristic values according to the optional references, which include characteristic factor, PIN code, and/or session information. In this case, the characteristic factor includes a time value or times of generating characteristic values; specifically, as described by embodiment 1, no more detail is given here;

Specifically, it is to combine the third data and optional references. The combining includes, but not limited to, a serial connection; encrypting the combined data by using the third predetermined cipher algorithm; and cutting the encrypting result to be short by using the third predetermined cutting processing method to obtain the characteristic value.

Specifically, if the optional references include a characteristic factor, the second terminal 303 further includes an updating module configured to update the characteristic factor after the sixth characteristic value is generated.

Embodiment 4

Figure 4:
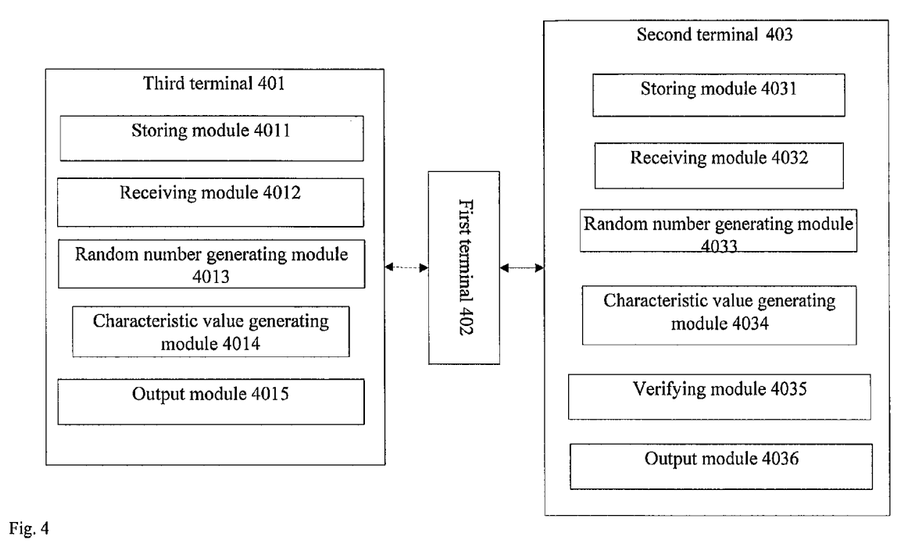
FIG. 4 is a structural diagram of a system of securely accessing to protected resource provided by Embodiment 4 of the present invention

The embodiment 4 provides a verifying system. Referring to FIG. 4, the system includes a third terminal 401, a first terminal 402, and a second terminal 403, in which functions of respective devices are as the following:

the third terminal 401 includes a storing module 4011 configured to store associated information for generating a characteristic value; the associated information includes a secret of generating the characteristic value and a predetermined processing method;

in which the predetermined processing method includes a predetermined cipher algorithm and a cutting processing method;

a receiving module 4012 configured to receive confirming information input by the user (e.g. by pressing keys, etc.) and a second data generated by the random number generating module 4033 of the second terminal;

a random number generating module 4013 configured to generated a first data, which is a random number;

a characteristic value generating module 4014 configured to process the first data, the second data, and the secret stored in the storing module 4011 to generate a second characteristic value by using a method which is identical to the first predetermined processing method used by the characteristic value generating module 4033 of the second terminal; and process the first data, the second data, and the secret stored in the storing module 4011 to generate the third characteristic value by using the method which is identical to the second predetermined processing method used by the characteristic value generating module 4033 of the second terminal after the first receiving module 4012 receives the confirming information of the user;

specifically, the characteristic value generating module 4014 includes a combining unit 4014A configured to serially connect the first data generated by the random number generating module 4013 and the second data received by the receiving module 4012;

an encrypting unit 4014B configured to encrypt the connecting result of the combining unit 4014A according to the secret stored in the storing module 4011 by using the first predetermined cipher algorithm;

a generating unit 4014C configured to process the encrypting result of the encrypting unit 4014B by using the first predetermined cutting processing method to generate a second characteristic value;

and a combining unit 4014A' configured to serially connect the second data and the first data;

an encrypting unit 4014B' configured to encrypt the connecting result of the combining unit 4014A' according to the secret stored in the storing module 4011 by using the second predetermined cipher algorithm;

a generating unit 4014C' configured to process the encrypting result of the encrypting unit 4014B' to generate the third characteristic value; and the output module 4015 configured to, after the received module 4012 receives the confirming information input by the user, output the second characteristic value and the third characteristic value, in which, after the output module 4015 outputs the second characteristic value, the user determines whether the second characteristic value is identical to the first characteristic value generated by the second terminal by comparison, if they are identical, the second terminal is regarded to be legitimate;

in which the receiving module 4012 in the present embodiment 4 further can receive PIN code, and session information, etc. input by the user;

The first terminal 402 includes a sending module 4021 configured to send the request of accessing to the protected resource, the user name, the first data generated by the random number generating module 4013 of the third terminal, and the third characteristic value generated by the characteristic value generating module 4014, which are input by the user; and a receiving module 4022 configured to receive the second data generated by the random number generating module 4033 of the second terminal and the first characteristic value generated by the characteristic value generating module 4013 of the second terminal and outputs the second data and the first characteristic value to the user;

in which the first terminal 402 and the second terminal 403, which are connected via Internet, have an input device and an output device; the input device is configured to receive information input by the user and send the information to the second terminal via network and the input device can be a keyboard, etc; the output device can output the information received by the second terminal 403 to the user; the output device can be a displayer or an audio player, etc.

The second terminal 403 includes a storing module 4031 configured to store associated information, which includes the secret of the third terminal bound with the user name and a predetermined processing method, for generating the characteristic value;

a receiving module 4032 configured to receive the request of accessing to the protected resource sent by the sending module 4021 of the first terminal 402, the user name, the first data, and the third characteristic value;

a random number generating module 4033 configured to generate a random number, i.e. the second data in the present embodiment 4;

a characteristic value generating module 4034 configured to, after the receiving module 4032 receives the first data, process the first data, the second data, and the secret stored in the storing module 4031 to generate the first characteristic value by using the first predetermined processing method; when the receiving module 4032 receives the third characteristic value, process the first data, the second data, and the secret stored by the storing module 4031 to generate the fourth characteristic value by using the second predetermined processing method;

specifically, the characteristic value generating module 4034 includes a searching unit 4034A configured to search for the secret of the third terminal 401 and the predetermined processing method in the storing module 4031 according to the user name received by the receiving module 4032;

a combining unit 4034B configure to serially connect the first data and the second data;

an encrypting unit 4034C configure to encrypt the connecting result of the combining unit 4034B by using the first predetermined cipher algorithm according to the found secret;

a generating unit 4034D configured to process the encryption result of the encrypting unit 4034C by using the first predetermined cutting processing method to generate the first characteristic value;

and a combining unit 4034W configured to serially connect the second data and the first data;

an encrypting unit 4034C' configured to encrypt the connecting result of the combining unit 4034B' by using the second predetermined cipher algorithm according to the found secret;

a generating unit 4034D' configured to process the encrypting result of the encrypting unit 4034C' to generate the fourth characteristic value by using the second predetermined cutting processing method;

a verifying module 4035 configured to determine whether the fourth characteristic value generated by the characteristic value generating module 4034 is identical to the third characteristic value received by the connecting module 4032; if they are identical, the first terminal is regarded to be legitimate;

specifically, the verifying module 4035 includes a comparing unit 4035A configured to determine whether the fourth characteristic value generated by the characteristic value generating module 4034 is identical to the received third characteristic value; and an executing unit 4035B configured to, if the comparing result of the comparing unit 4035A is that the fourth characteristic value generated by the characteristic value generating module 4034 is identical to the received third characteristic value, accessing to the protected resource is permitted; if the comparing result of the comparing unit 4035A is that the fourth characteristic value generated by the characteristic value generating module 4034 is not identical to the received third characteristic value, accessing to the protected resource is refused, and an output module 4036 configured to, after the characteristic value generating module 4034 generates the second data and the first characteristic value, output the second data and the first characteristic value to the first terminal 402.

In the embodiment 4, the receiving module 4032 is further configured to receive the PIN code and session information, etc. returned by the first terminal 402.

In the present embodiment 4, the first predetermined cipher algorithm and the second predetermined cipher algorithm include fingerprint algorithm or encryption hash algorithm.

In the present embodiment 4, the first predetermined cutting processing method and the second predetermined cutting processing method include mask compressing or custom compressing method.

In the present embodiment 4, the characteristic value generating module 4013 and the character value generating module 4034 can generate characteristic values according to optional references which include characteristic factor, PIN code, and/or session information; the characteristic factor includes time value or times of generating characteristic values.

Specifically, the first data, the second data, and the optional references are combined. The combining includes, but not limited to, serial connecting; encrypting the combined data by using the predetermined cipher algorithm; and cutting the encrypting result to be short by using the predetermined cutting processing method to obtain the characteristic value; as corresponding description in Embodiment 2, no further detail is given here.

Specifically, if the optional references include a characteristic factor, the second terminal 403 further includes an updating module configured to update the characteristic factor after the first and the fourth characteristic values are generated.

The method and the system provided by the embodiments can realize digital signature and identification verification, which prevent the attack from the intermediate phishing website and provide security for the transaction on the internet.

The presently disclosed preferred embodiments should be considered in all respects to be illustrative and not restrictive. The scope of the invention is indicated by the appended claims rather than the foregoing description, and all variations which come within the meaning and range of equivalents thereof are intended to be embraced therein.

The invention claimed is:

1. A method for securely accessing a protected resource in a second terminal, wherein said method comprises the steps of:

receiving by a second terminal a request of accessing the protected resource sent by a first terminal;

generating a third data according to a predetermined algorithm by the second terminal;

sending the third data to the first terminal by the second terminal;

inputting the third data displayed by the first terminal to the third terminal by a user;

processing by the third terminal the third data input by the user and a secret pre-stored by the third terminal according to a third predetermined processing method to obtain a fifth characteristic value;

inputting the fifth characteristic value displayed by the third terminal and a user name to the first terminal by the user;

sending by the first terminal the fifth characteristic value and the user name input by the user to the second terminal;

searching for the secret of the third terminal according to the user name by the second terminal;

processing the third data and the found secret according to an algorithm which is identical to the third predetermined processing method, so as to obtain a sixth characteristic value by the second terminal;

comparing the sixth characteristic value with the fifth characteristic value to determine whether they are identical by the second terminal;

permitting accessing if they are identical;

refusing accessing if they are not identical wherein the first terminal and the second terminal are connected via an internet;

wherein the first terminal and the third terminal are not connected, and data exchanges between the first terminal and the third terminal are accomplished through the user, wherein the third data is displayed to the user by the first terminal and input to the third terminal by the user; and the fifth characteristic value is displayed to the user by the third terminal and input to the first terminal by the user.

2. The method of claim 1, wherein that the third terminal processes the third data input by the user and a secret pre-stored by the third terminal according to a third predetermined processing method comprises encrypting the third data according to the secret pre-stored by the third terminal by using the third predetermined cipher algorithm, so as to obtain cipher information; and cutting the cipher information to be short by using a fourth predetermined cutting method, so as to obtain the fifth characteristic value.

3. The method of claim 1, wherein the method further comprises, when the third terminal and the second terminal generate characteristic values, data participating in computing further comprising a characteristic factor, PIN code, and/or session information besides the third data and the secret;

in which the characteristic factor comprises time value or times of generating characteristic values.

4. A method for securely accessing a protected resource in a second terminal, wherein said method comprises the steps of:
generating and displaying a first data by a third terminal;
inputting the first data generated and displayed by the third terminal and a user name to a first terminal by a user;
sending a request of accessing the protected resource to the second terminal by the first terminal;
sending the user name and the first data to the second terminal by the first terminal;
generating a second data by the second terminal;
searching for a secret of the third terminal according to the user name by the second terminal;
processing the first data, the second data, and the secret of the third terminal according to a first predetermined processing method, so as to obtain a first characteristic value by the second terminal;
sending the first characteristic value and the second data to the first terminal by the second terminal;
displaying the first characteristic value and the second data to the user by the first terminal;
inputting the second data displayed by the first terminal to the third terminal by the user;
processing the first data, the second data, and a secret pre-stored by the third terminal according to a processing method which is identical as the first predetermined processing method to obtain a second characteristic value;
determining whether the second terminal is valid through comparing the first characteristic value with the second characteristic value by the user;
processing the first data, the second data, and the secret pre-stored by the third terminal according to a second predetermined processing method to obtain a third characteristic value;
displaying the third characteristic value to the user by the third terminal;
inputting the third characteristic value to the first terminal by the user;
sending the third characteristic value input by the user to the second terminal by the first terminal;
processing the first data, the second data, and the secret according to a processing method which is identical to the second predetermined processing method, to generate a fourth characteristic value;
determining whether the first terminal is valid through comparing the third characteristic value with the fourth characteristic value by the second terminal;
permitting accessing if the first terminal is valid;
refusing accessing if the first terminal is not valid wherein the first terminal and the second terminal are connected via an internet;
wherein the first terminal and the third terminal are not connected, and the data exchanges between the first terminal and the third terminal are accomplished through the user, wherein the first data is generated by the third terminal and displayed to the user by the third terminal;
the second data is displayed to the user by the first terminal and input to the third terminal by the user;
the second characteristic value is generated by the third terminal and displayed to the user by the third terminal for comparing; and
the third characteristic value is displayed to the user by the third terminal and input to the first terminal by the user.

5. The method of claim 4, wherein that the second terminal processes the first data, the second data, and the found secret according to a first predetermined processing method so as to obtain a first characteristic value comprises
serially connecting the first data and the second data, so as to obtain a first intermediate value;
processing the first intermediate value according to the found secret by using a first predetermined cipher algorithm, so as to obtain cipher information; and
cutting the cipher information to be short by using a first predetermined cutting method, so as to obtain the first characteristic value.

6. The method of claim 4, wherein that the third terminal processes the first data, the second data, and the secret pre-stored by the third terminal according to a second predetermined processing method, so as to obtain a third characteristic value comprises
serially connecting the second data and the first data, so as to obtain a second intermediate value;
encrypting the second intermediate value according to the secret pre-stored by the third terminal by using a second predetermined cipher algorithm, so as to obtain cipher information; and
cutting the cipher information to be short by using a second predetermined cutting method, so as to obtain the third characteristic value.

7. The method of claim 4, wherein the method further comprises, when the third terminal and the second terminal generate characteristic values, the processed data further comprising a characteristic factor, PIN code, and/or session information besides the first data, the second data, and the secret;
in which the characteristic factor comprises a time value or times of generating characteristic values.

8. The method of claim 7, wherein after the third terminal and the second terminal generate characteristic values, the characteristic factor is updated.

9. The method of claim 7, wherein the method further comprises that, the second terminal processes the first data, the second data, as well as the characteristic factor, PIN code, and/or session information, and the found secret according to the first predetermined processing method, so as to obtain the first characteristic value.

10. The method of claim 7, wherein the method further comprises that, the third terminal processes the first data, the second data, as well as the characteristic factor, PIN code, and/or session information, and the secret pre-stored by the third terminal according to the second predetermined processing method, so as to obtain the third characteristic value.

* * * * *